United States Patent
Sens et al.

[11] Patent Number: 5,811,370
[45] Date of Patent: Sep. 22, 1998

[54] AZAMETHINE DYES

[75] Inventors: Rüdiger Sens, Mannheim; Andreas Johann Schmidt, Freinsheim; Stefan Beckmann, Bad Dürkheim; Karl-Heinz Etzbach, Frankenthal, all of Germany

[73] Assignee: BASF Aktiengesellschaft, Ludwigshafen, Germany

[21] Appl. No.: 817,921

[22] PCT Filed: Nov. 3, 1995

[86] PCT No.: PCT/EP95/04314

§ 371 Date: May 8, 1997

§ 102(e) Date: May 8, 1997

[87] PCT Pub. No.: WO96/15196

PCT Pub. Date: May 23, 1996

[30] Foreign Application Priority Data

Nov. 12, 1994 [DE] Germany .......................... 44 40 486.7

[51] Int. Cl.$^6$ .......................... C09B 53/00; C09B 55/00; B41M 5/38

[52] U.S. Cl. .......................... 503/227; 552/302; 546/113; 546/119; 546/120; 546/122; 546/171; 546/288; 546/291; 546/292; 546/296; 546/297

[58] Field of Search .......................... 503/227; 552/302; 546/113, 119, 120, 122, 171, 288, 291, 292, 296, 297

[56] References Cited

U.S. PATENT DOCUMENTS

| | | | |
|---|---|---|---|
| 4,975,409 | 12/1990 | Hisashi et al. | 503/227 |
| 5,034,371 | 7/1991 | Tanaka et al. | 503/227 |
| 5,079,365 | 1/1992 | Sens et al. | 546/119 |
| 5,132,439 | 7/1992 | Schultz et al. | 552/302 |
| 5,218,120 | 6/1993 | Sens et al. | 546/166 |
| 5,221,658 | 6/1993 | Bach et al. | 503/227 |
| 5,225,548 | 7/1993 | Bach et al. | 544/105 |
| 5,227,359 | 7/1993 | Hisashi et al. | 503/227 |
| 5,238,903 | 8/1993 | Hisashi et al. | 503/227 |
| 5,310,942 | 5/1994 | Bach et al. | 544/105 |
| 5,312,926 | 5/1994 | Bach et al. | 548/195 |

FOREIGN PATENT DOCUMENTS

| | | |
|---|---|---|
| A 0 399 473 | 5/1990 | European Pat. Off. . |
| A 0 480 252 | 4/1992 | European Pat. Off. . |
| WO 91/19648 | 12/1991 | WIPO . |
| WO 95/00564 | 1/1995 | WIPO . |

*Primary Examiner*—Richard L. Raymond
*Attorney, Agent, or Firm*—Oblon, Spivak, McClelland, Maier & Neustadt, P.C.

[57] ABSTRACT

Azamethine dyes of the formula

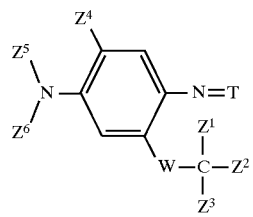

where

W is oxygen, sulfur or a radical of the formula —NH—CO—, —NH—COO— oder —NH—SO$_2$—, $Z^1$ is $C_1$–$C_4$-alkyl with or without substitution, phenyl or $C_1$–$C_4$-alkoxy, $Z^2$ and $Z^3$ are each hydrogen or $C_1$–$C_4$-alkyl with or without substitution, provided —$CZ^1Z^2Z^3$ is not linear and is not isopropyl, $Z^4$ is hydrogen, $C_1$–$C_4$-alkyl or $C_1$–$C_4$-alkoxy, $Z^5$ and $Z^6$ are each $C_1$–$C_{10}$-alkyl with or without substitution, $C_3$–$C_4$-alkenyl, $C_5$–$C_7$-cycloalkyl, phenyl or tolyl, or together with the nitrogen atom joining them together a heterocyclic radical or $Z^4$ and $Z^5$ are together a bridge member, and T is a radical of a cyclic acidic—CH compound H$_2$T, are useful for thermal transfer.

17 Claims, No Drawings

AZAMETHINE DYES

This application is a 371 of PCT/EP95/04314, filed Nov. 3, 1995.

SUMMARY OF THE INVENTION

The present invention relates to novel azamethine dyes of the formula I

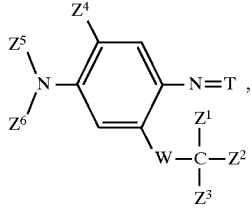

where

W is oxygen, sulfur or a radical of the formula —NH—CO—, —NH—COO— or —NH—SO$_2$—, $Z^1$ is $C_1$–$C_4$-alkyl with or without interruption by an oxygen atom in ether function, benzyl, phenylethyl, phenyl or $C_1$–$C_4$-alkoxy, $Z^2$ and $Z^3$ are independently of each other hydrogen, $C_1$–$C_4$-alkyl with or without interruption by an oxygen atom in ether function, benzyl or phenylethyl, provided that radical —$CZ^1Z^2Z^3$ is not linear and is not isopropyl, $Z^4$ is hydrogen, $C_1$–$C_4$-alkyl or $C_1$–$C_4$-alkoxy, $Z^5$ and $Z^6$ are independently of each other $C_1$–$C_{10}$-alkyl with or without substitution and with or without interruption by from 1 to 3 oxygen atoms in ether function, $C_3$–$C_4$-alkenyl, $C_5$–$C_7$-cycloalkyl, phenyl or tolyl, or together with the nitrogen atom joining them together a 5- or 6-membered saturated heterocyclic radical with or without further hetero atoms, or $Z^4$ and $Z^5$ are together a 2- or 3-membered bridge member with or without a hetero atom, and T is a radical of the formula

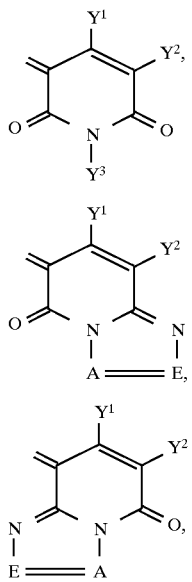

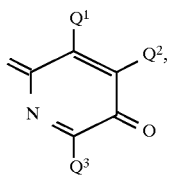

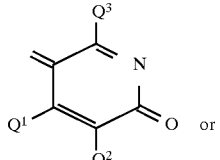

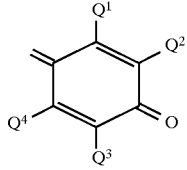

where $Y^1$ is hydrogen, $C_1$–$C_4$-alkyl with or without interruption by an oxygen atom in ether function, $C_1$–$C_4$-fluoroalkyl, substituted or unsubstituted phenyl or $C_1$–$C_8$-alkoxycarbonyl, $Y^2$ is cyano, carbamoyl, mono- or di($C_1$–$C_8$-alkyl)carbamoyl, carboxyl or $C_1$–$C_8$-alkoxycarbonyl, $Y^3$ is $C_1$–$C_{10}$-alkyl with or without substitution and with or without interruption by from 1 to 3 oxygen atoms in ether function, $C_5$–$C_7$-cycloalkyl, substituted or unsubstituted phenyl or a radical of the formula $NB^1B^2$, where $B^1$ and $B^2$ are independently of each other hydrogen, $C_1$–$C_{10}$-alkyl, substituted or unsubstituted phenyl, $C_1$–$C_9$-alkanoyl, phenylsulfonyl, pyridylsulfonyl, substituted or unsubstituted benzoyl, pyridylcarbonyl or thienylcarbonyl, one of A and E is a nitrogen and the other is a radical of formula C—$Y^4$ where $Y^4$ is $C_1$–$C_{20}$-alkyl with or without substitution and with or without interruption by from 1 to 4 oxygen atoms in ether function, substituted or unsubstituted phenyl, mercapto or substituted or unsubstituted $C_1$–$C_{20}$-alkylthio, and $Q^1$, $Q^2$, $Q^3$ and $Q^4$ are independently of one another hydrogen, $C_1$–$C_{10}$-alkyl, $C_1$–$C_{10}$-fluoroalkyl, $C_1$–$C_4$-alkoxy, halogen, formylamino or a radical of the formula $R^3$, —CO—$OR^1$, —CO—$NHR^1$, —CO—NH—CO—$R^1$, —CO—NH—CO—$R^3$, —CO—NH—SO$_2$—$R^3$, —NH—CO—$R^1$, —NH—CO—$OR^1$, —NH—CO—$NR^1R^2$, NH—CS—$OR^1$, —NH—CS—$NR^1R^2$, —NH—CO—$R^3$, —NH—SO$_2$—$R^1$, —NH—SO$_2$—$R^3$ or —NH—SO$_2$—$NR^1R^2$, where $R^1$ and $R^2$ are independently of each other $C_1$–$C_{10}$-alkyl with or without substitution and with or without interruption by 1 to 3 oxygen atoms in ether function, $C_1$–$C_{10}$-fluoroalkyl, $C_5$–$C_7$-cycloalkyl, phenyl or tolyl or —$NR^1R^2$ is also amino and $R^3$ is a 5- or 6-membered aromatic heterocyclic radical with or without benzofusion and with or without one or more hetero atoms selected from the group consisting of nitrogen, oxygen and sulfur, or $Q^1$ and $Q^2$ are together with the carbon atoms to which they are bonded a 5- or 6-membered carbocylic or heterocyclic ring, and to a process for their thermal transfer.

U.S. Pat. No. 5,079,365, U.S. Pat. No. 5,312,926, U.S. Pat. No. 5,218,120, U.S. Pat. No. 5,221,658, U.S. Pat. No.

5,310,942, U.S. Pat. No. 5,225,548, U.S. Pat. No. 5,034,371 and Patent Application PCT/EP 95/00564 disclose similar dyes. However, it has been found that these dyes still have defects in their application properties. U.S. Pat. No. 4,975, 409, U.S. Pat. No. 5,238,903 and U.S. Pat. No. 5,227,359 also describe azamethine dyes.

It is an object of the present invention to provide novel azamethine dyes which shall be advantageous for non-impact printing processes, for example for thermal transfer, showing in that use in particular a high thermal stability, high lightfastness, high color strength and high brilliance. The novel dyes should also be advantageous for dyeing or printing textile materials.

We have found that this object is achieved by the azamethine dyes of the formula I defined at the beginning.

Any alkyl or alkenyl appearing in the abovementioned formulae may be straight-chain or branched.

Any substituted alkyl appearing in the abovementioned formulae may have as substituents for example substituted or unsubstituted phenyl, substituted or unsubstituted phenoxy, carboxyl, $C_1$-$C_{20}$-alkoxycarbonyl whose alkyl chain may be interrupted by from 1 to 4 oxygen atoms in ether function and may be phenyl- or phenoxy-substituted, cyano, $C_1$-$C_6$-alkanoyloxy, $C_1$-$C_4$-alkylaminocarbonyloxy or $C_1$-$C_4$-alkoxycarbonyloxy wherein the alkyl group in both of the last two cases may be substituted by phenyl or $C_1$-$C_4$-alkoxy. The number of substituents in substituted alkyl is generally 1 or 2.

Any oxygen-interrupted alkyl appearing in the abovementioned formulae is preferably interrupted by 1 or 2 oxygen atoms in ether function.

Any substituted phenyl appearing in the abovementioned formulae may have as substituents for example $C_1$-$C_4$-alkyl, $C_1$-$C_4$-alkoxy, halogen, in particular chlorine or bromine, nitro or carboxyl. The number of substituents in substituted phenyl is generally from 1 to 3.

$B^1$, $B^2$, $Q^1$, $Q^2$, $Q^3$, $Q^4$, $R^1$, $R^2$, $Y^1$, $Y^3$, $Y^4$, $Z^1$, $Z^2$, $Z^3$, $Z^4$, $Z^5$ and $Z^6$ are each for example methyl, ethyl, propyl, isopropyl, butyl, isobutyl, sec-butyl or tert-butyl.

$B^1$, $B^2$, $Q^1$, $Q^2$, $Q^3$, $Q^4$, $R^1$, $R^2$, $Y^3$, $Y^4$, $Z^5$ and $Z^6$ may each also be for example pentyl, isopentyl, neopentyl, tert-pentyl, hexyl, 2-methylpentyl, heptyl, octyl, 2-ethylhexyl, isooctyl, nonyl, isononyl, decyl or isodecyl.

$Y^4$ may also be for example undecyl, dodecyl, tridecyl, isotridecyl, tetradecyl, pentadecyl, hexadecyl, heptadecyl, octadecyl, nonadecyl or eicosyl. [The designations isooctyl, isononyl, isodecyl and isotridecyl are trivial names derived from the oxo process alcohols (cf. Ullmann's Encyclopedia of Industrial Chemistry, 5th Edition, Vol. A1, pages 290 to 293, and also Vol. A 10, pages 284 and 285).]

$R^1$, $R^2$, $Y^1$, $Y^3$, $Y^4$, $Z^1$, $Z^2$, $Z^3$, $Z^5$ and $Z^6$ are each for example methoxymethyl, 2-methoxyethyl, 2-ethoxyethyl or 2- or 3-methoxypropyl.

$R^1$, $R^2$, $Y^3$, $Y^4$, $Z^5$ and $Z^6$ may each also be for example 2-propoxyethyl, 2-butoxyethyl, 2- or 3-ethoxypropyl, 2- or 3-propoxypropyl, 2- or 3-butoxypropyl, 2- or 4-methoxybutyl, 2- or 4-ethoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,9-trioxadecyl, 3,6,9-trioxaundecyl, 2-carboxylethyl, 2- or 3-carboxylpropyl, benzyl, 1- or 2-phenylethyl, 2-, 3- or 4-methylbenzyl, 2-, 3- or 4-methoxybenzyl, 2-, 3- or 4-chlorobenzyl, 2-, 3- or 4-nitrobenzyl, 3-benzyloxypropyl, phenoxymethyl, 6-phenoxy-4-oxahexyl, 8-phenoxy-4-oxaoctyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-methylaminocarbonyloxyethyl, 2- or 3-ethylaminocarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl or 2- or 3-(2-ethoxyethoxycarbonyloxy)propyl.

$Q^1$, $Q^2$, $Q^3$, $Q^4$, $R^1$, $R^2$ and $Y^1$ may each also be for example fluoromethyl, difluoromethyl, trifluormethyl, 1,1,1-trifluoroethyl, pentylfluoroethyl, bis(trifluoromethyl)methyl or heptafluoropropyl.

$Y^4$ may also be for example 3,6,9,12-tetraoxatridecyl, 3,6,9,12-tetraoxatetradecyl, methylthio, ethylthio, propylthio, isopropylthio, butylthio, isobutylthio, sec-butylthio, pentylthio, isopentylthio, neopentylthio, tert-pentylthio, hexylthio, heptylthio, 1-ethylpentylthio, octylthio, isooctylthio, 2-ethylhexylthio, nonylthio, isononylthio, decylthio, isodecylthio, undecylthio, dodecylthio, tridecylthio, isotridecylthio, tetradecylthio, pentadecylthio, hexadecylthio, heptadecylthio, octadecylthio, nonadecylthio or eicosylthio.

$B^1$, $B^2$, $Y^1$, $Y^3$ and $Y^4$ may each also be for example phenyl, 2-, 3- or 4-methylphenyl, 2-, 3- or 4-ethylphenyl, 2-, 3- or 4-propylphenyl, 2-, 3-or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-chlorophenyl, 2-, 3- or 4-carboxylphenyl or 2-, 3- or 4-nitrophenyl.

$Q^1$, $Q^2$, $Q^3$, $Q^4$, $Y^3$, $Z^5$ and $Z^6$ may each also be for example cyclopentyl, cyclohexyl or cycloheptyl.

$Z^5$ and $Z^6$ may each also be for example allyl or methallyl.

$Y^2$ is for example mono- or dimethylcarbamoyl, mono- or diethylcarbamoyl, mono- or dipropylcarbamoyl, mono- or diisopropylcarbamoyl, mono- or dibutylcarbamoyl, mono- or dipentylcarbamoyl, mono- or dihexylcarbamoyl, mono- or diheptylcarbamoyl, mono- or dioctylcarbamoyl, mono- or bis(2-ethylhexyl)carbamoyl or N-methyl-N-ethylcarbamoyl.

$B^1$ and $B^2$ may each also be for example formyl, acetyl, propionyl, butyryl, isobutyryl, pentanoyl, hexanoyl, heptanoyl, octanoyl, 2-ethylhexanoyl, isooctanoyl, nonanoyl, isononanoyl, benzoyl, 2-, 3- or 4-methylbenzoyl or 2-, 3- or 4-methoxybenzoyl.

$Y^1$ and $Y^2$ may each also be for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl, hexyloxycarbonyl, heptyloxycarbonyl, octyloxycarbonyl, isooctyloxycarbonyl or 2-ethylhexyloxycarbonyl.

$Q^1$, $Q^2$, $Q^3$ and $Q^4$ may each also be for example fluorine, chlorine or bromine.

$Q^1$, $Q^2$, $Q^3$, $Q^4$, $Z^1$ and $Z^4$ may each also be for example methoxy, ethoxy, propoxy, isopropoxy, butoxy, isobutoxy, sec-butoxy or tert-butoxy.

$Z^4$ and $Z^5$ combined into a 2- or 3-membered bridge member with or without a hetero atom may be for example ethylene, 1,3-propylene which may be methyl-trisubstituted, or ethyleneoxy.

$Q^1$ and $Q^2$ combined with the carbon atoms to which they are bonded into a 5- or 6-membered carbocyclic or heterocyclic ring can be for example the benzene, pyridine, pyrrolinone or dihydropyridone ring, in which case these rings may each be monosubstituted, disubstituted or trisubstituted by $C_1-C_4$-alkyl, $C_1-C_4$-alkoxy or halogen.

$Z^5$ and $Z^6$ combined with the nitrogen atom joining them together into a 5- or 6-membered saturated heterocyclic radical with or without further hetero atoms can be for example pyrrolidinyl, piperidinyl, morpholinyl, piperazinyl or N-($C_1-C_4$-alkyl)piperazinyl.

$R^3$ is derived from the 5- or 6-membered aromatic heterocyclic radical which may be benzofused and which has one or more hetero atoms selected from the group consisting of nitrogen, oxygen and sulfur.

Suitable heterocyclic species, substituted or unsubstituted, from which $R^3$ is derived include for example pyrrole, furan, thiophene, pyrazole, imidazole, oxazole, thiazole, isothiazole, 1,2,4-triazole, 1,2,4-oxadiazole, 1,3,4-oxadiazole, 1,2,4-thiadiazole, 1,3,4-thiadiazole, pyridine, pyridazine, pyrimidine and pyrazine.

Attention may be drawn in particular to heterocycles of the pyrrole, thiophene, isoxazole, pyridine or pyridazine series.

Suitable $R^3$—CO or $R^3$—$SO_2$ radicals include in particular those 5- or 6-membered aromatic heterocyclic radicals which are derived from the following heterocyclic carboxylic acids $R^3$—COOH or sulfonic acids $R^3$—$SO_3H$:

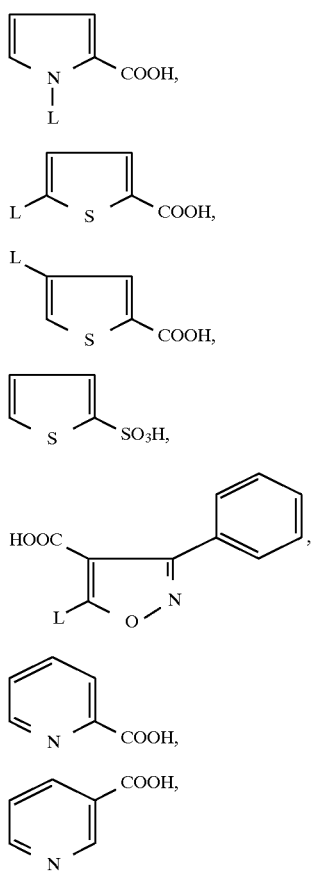

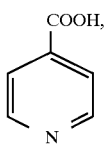

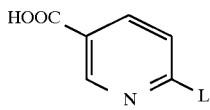

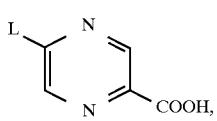

where L is $C_1-C_4$-alkyl in each case.

Suitable $R^3$ radicals include in particular the radicals of the formulae IIIa to III; where the COOH or $SO_3H$ group is replaced by a single bond.

Preference is given to azamethine dyes of the formula I where W is a radical of the formula —NH—CO—.

Preference is further given to azamethine dyes of the formula I where $Z^1$, $Z^2$ and $Z^3$ are independently of one another $C_1-C_4$-alkyl.

Preference is further given to azamethine dyes of the formula I where $Z^4$ is hydrogen.

Preference is further given to azamethine dyes of the formula I where $Z^5$ and $Z^6$ are independently of each other $C_1-C_{10}$-alkyl or together with the nitrogen atom joining them together a 5- or 6-membered saturated heterocyclic radical with or without an additional nitrogen or oxygen atom in the ring.

Preference is further given to azamethine dyes of the formula I where $Y^1$ in the radical T is $C_1-C_4$-alkyl.

Preference is further given to azamethine dyes of the formula I where $Y^2$ in the radical T is cyano.

Preference is further given to azamethine dyes of the formula I where $Y^3$ in the radical T is $C_1-C_{10}$-alkyl, $C_1-C_9$-alkanoylamino, benzoylamino, bis($C_1-C_9$-alkanoyl)amino or N-($C_1-C_9$-alkanoyl)-N-benzoylamino.

Preference is further given to azamethine dyes of the formula I where $Y^4$ in the radical T is $C_1-C_{20}$-alkyl with or without interruption by from 1 to 4 oxygen atoms in ether function.

Preference is further given to azamethine dyes of the formula I where $Q^1$, $Q^2$, $Q^3$ and $Q^4$ in the radical T are independently of one another hydrogen, $C_1-C_8$-alkyl, halogen or $C_1-C_{11}$-alkanoylamino or $Q^1$ and $Q^2$ are together with the carbon atoms to which they are bonded a benzene, pyridine, pyrrolinone or dihydropyridone ring which may be $C_1-C_4$-alkyl- or halogen-substituted.

Particular preference is given to azamethine dyes of the formula I where T is a radical of the formula IId, IIe or IIf, of which the radicals IId and IIf are of particular importance.

Particular preference is further given to azamethine dyes of the formula I where —$CZ^1Z^2Z^3$ is branched $C_4-C_{13}$-alkyl, of particular suitability being the radical —$CZ^1Z^2Z^3$ where $Z^1$, $Z^2$ and $Z^3$ are each $C_1-C_4$-alkyl, especially methyl.

Of particular industrial interest are azamethine dyes of the formula Ia

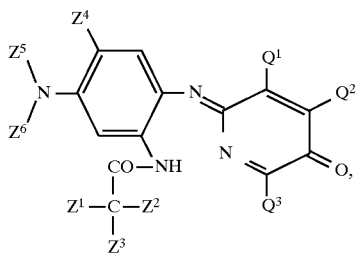

(Ia)

where $Z^1$, $Z^2$ and $Z^3$ are independently of one another $C_1$–$C_4$-alkyl, especially methyl, $Z^4$ is hydrogen, $C_1$–$C_4$-alkyl or $C_1$–$C_4$-alkoxy, $Z^5$ and $Z^6$ are independently of each other $C_1$–$C_{10}$-alkyl, $Q^1$ and $Q^2$ are independently of each other hydrogen, $C_1$–$C_6$-alkyl, trifluoromethyl or halogen, and $Q^3$ is $C_1$–$C_{11}$-alkanoylamino, especially $C_2$–$C_8$-alkanoylamino, or unsubstituted or methyl-substituted benzoylamino.

Also of particular industrial interest are azamethine dyes of the formula Ia where $Z^1$, $Z^2$ and $Z^3$ are independently of one another $C_1$–$C_4$-alkyl, especially methyl, $Z^4$ is hydrogen, $C_1$–$C_4$-alkyl or $C_1$–$C_4$-alkoxy, $Z^5$ and $Z^6$ are independently of each other $C_1$–$C_{10}$-alkyl, $Q^1$ and $Q^3$ are independently of each other hydrogen, $C_1$–$C_6$-alkyl, trifluoromethyl or halogen, and $Q^2$ is $C_1$–$C_{11}$-alkanoylamino, especially $C_2$–$C_8$-alkanoylamino, or unsubstituted or methyl-substituted benzoylamino.

Also of particular industrial interest are azamethine dyes of the formula Ib

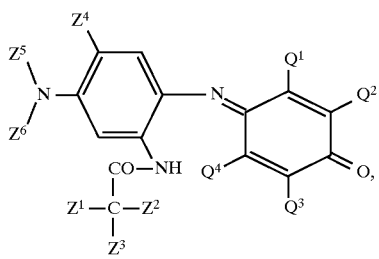

(Ib)

where $Z^1$, $Z^2$ and $Z^3$ are independently of one another $C_1$–$C_4$-alkyl, especially methyl, $Z^4$ is hydrogen, $C_1$–$C_4$-alkyl or $C_1$–$C_4$-alkoxy, $Z^5$ and $Z^6$ are independently of each other $C_1$–$C_{10}$-alkyl, $Q^1$, $Q^2$, $Q^3$ and $Q^4$ are independently of one another hydrogen, $C_1$–$C_6$-alkyl, trifluoromethyl, halogen, $C_1$–$C_{11}$-alkanoylamino or unsubstituted or methyl-substituted benzoylamino.

The azamethine dyes of the formula I are obtainable in a conventional manner.

For example, a nitroso compound of the formula IV

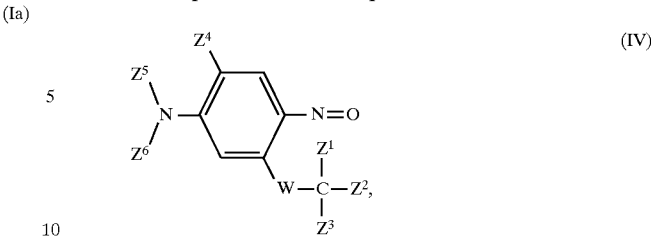

(IV)

where W, $Z^1$, $Z^2$, $Z^3$, $Z^4$, $Z^5$ and $Z^6$ are each as defined above, can be condensed with an acidic—CH compound of the formula V $$H_2T \quad (V),$$

where T is as defined above.

However, it is also possible to prepare the dyes by oxidative coupling of an amino compound of the formula VI

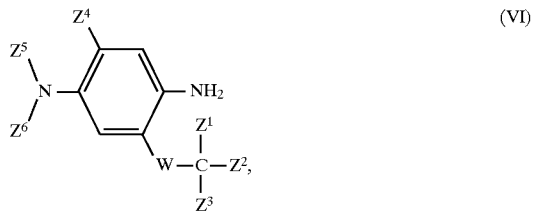

(VI)

where W, $Z^1$, $Z^2$, $Z^3$, $Z^4$, $Z^5$ and $Z^6$ are each as defined above, with an acidic—CH compound of the formula V.

The present invention further provides a process for transferring dyes from a transfer to a plastic-coated paper by diffusion or sublimation with the aid of an energy source, which comprises using a transfer comprising one or more azamethine dyes of the formula I.

To prepare the transfers required for the process of the present invention, the dyes of the formula I are incorporated in a suitable organic solvent or in mixtures of solvents together with one or more binders, optionally with the addition of auxiliaries, to form a printing ink. This printing ink preferably contains the dyes of the formula I in a molecularly dispersed, ie. dissolved, form. The printing ink can be applied by means of a doctor blade to an inert support and air dried. Suitable organic solvents for the dyes of the formula I are for example those in which the solubility of the dyes of the formula I at 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymer materials which are soluble in organic solvents and which are capable of binding the dyes to the inert supports so that they will not rub off. Preference is given to those binders which, after the printing ink has dried, hold the dyes in the form of a clear, transparent film in which no visible crystallization of the dyes occurs.

Such binders are mentioned for example in U.S. Pat. No. 5,132,439 or in the pertinent patent applications cited therein. Also suitable are saturated linear polyesters.

Preferred binders are ethylcellulose, ethylhydroxyethylcellulose, polyvinylbutyral, polyvinyl acetate, cellulose propionate or saturated linear polyesters.

The weight ratio of binder:dye generally ranges from 1:1 to 10:1.

Suitable auxiliaries include for example release agents as mentioned in U.S. Pat. No. 5,132,439 or the pertinent patent applications cited therein. Other possibilities include in particular organic additives which prevent the crystallization of the transfer dyes in the course of storage or on heating of the ink ribbon, for example cholesterol or vanillin.

Suitable inert supports are described for example in U.S. Pat. No. 5,132,439 or in the pertinent patent applications cited therein. The thickness of the support is generally from 3 to 30 μm.

The dye receiver layer can in principle be any temperature-stable plastic layer with affinity for the dyes to be transferred, for example modified polycarbonates or polyesters. Further details can be found for example in U.S. Pat. No. 5,132,439 or the pertinent patent applications cited therein.

The transfer process is effected by means of an energy source, for example by means of a laser or a thermal printing head, the latter having to be heatable to a temperature of ≧300° C. in order that the dye transfer can take place within the time period t: 0<t<15 msec. The dye migrates out of the transfer sheet and diffuses into the surface coating of the receiving medium.

The dyes of the formula I according to the present invention are notable for advantageous application properties during the dye transfer. They are highly soluble in the ink ribbon (high compatibility with the binder), highly stable in the printing ink, readily transferable, possess high image stability (ie. good lightfastnesses and also good stability to ambient effects, for example moisture, temperature or chemicals) and permit a flexible coloristic adaptation to given subtractive primary colors as part of an optimal trichromat maximum brilliance of primary and secondary colors and deep neutral black. They are also notable for high brilliance due to the high transparencies in the blue and green spectrum.

The dyes of the formula I according to the present invention are also advantageous for dyeing synthetic materials, for example polyesters, polyamides or polycarbonates. Of particular suitability are materials in textile form, such as fibers, yarns, threads, knits, wovens or nonwovens composed of polyester, modified polyester, for example anionically modified polyester, or blend fabrics of polyester with cellulose, cotton, viscose or wool, or polyamide. The dyeing and printing conditions are known per se. The dyes of this invention can also be used for dyeing keratinous fibers, for example in hair dyeing or the dyeing of furs.

The novel dyes of the formula I are also advantageously suitable for manufacturing color filters as described for example in EP-A-399 473.

Finally they can also be used with advantage as colorants for producing toners for electrophotography.

The Examples which follow illustrate the invention.

A) PREPARATION

EXAMPLE 1

4.96 g (0.02 mol) of the compound of the formula

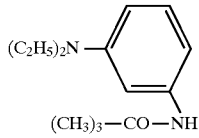

were dissolved in 50 ml of water and 20 ml of concentrated hydrochloric acid. At from 0° to 5° C. 6.5 ml of 23% strength by weight aqueous sodium nitrite solution were added dropwise and then stirred in at from 0° to 5° C. for 2 h. The resulting nitroso compound was adjusted with 25% strength by weight aqueous ammonia to pH 8 and taken up in ethyl acetate. The organic phase was concentrated and then dissolved in methanol. Thereafter a catalytic amount of Raney nickel was added for a reduction with hydrogen. The Raney nickel was then separated off, and the resulting solution was concentrated and added to 3 g (0.03 mol) of 2-acetaminophenol in 30 ml of ethanol and 50 ml of ethyl acetate. To the resulting mixture was added a solution of 4.2 g of sodium carbonate and 50 ml of water. A solution of 5.7 g (0.025 mol) of ammonium peroxodisulfate in 50 ml of water was then added dropwise. The organic phase was concentrated and the dye thus isolated was purified by column chromatography.

This yielded 2.54 g of the dye of the formula

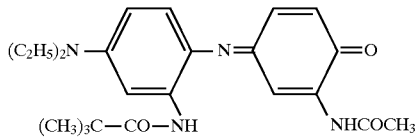

mp.:169° C.; $\lambda_{max}$ (in tetrahydrofuran): 626 nm

EXAMPLE 2

Example 1 was repeated with 0.025 mol of a compound of the formula

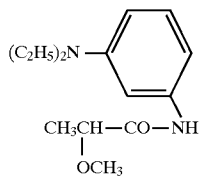

to give 3.55 g of the dye of the formula

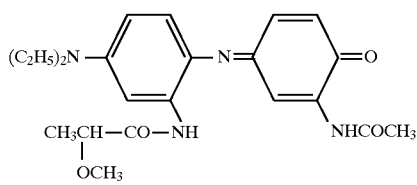

$\lambda_{max}$ (in tetrahydrofuran): 622 nm

EXAMPLE 3

6.8 g (0.025 mol) of the compound of the formula

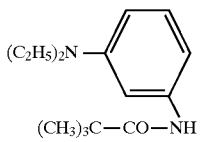

(91% strength by weight) were dissolved in 50 ml of water and 30 ml of concentrated hydrochloric acid. At from 0° to 5° C. 8 ml of 23% strength by weight aqueous sodium nitrite solution were added dropwise and stirred in at from 0° to 5° C. for 2 h.

After neutralization with 25% strength by weight aqueous ammonia, the resulting nitroso compound was extracted with ethyl acetate. The organic phase was concentrated, admixed with 200 ml of methanol and a catalytic amount of Raney nickel and reduced with hydrogen. After the reduction, the catalyst was separated off and the solution was concentrated. The resulting amino compound was admixed with a little ethanol and added to a suspension 4.9 g (0.025 mol) of the compound of the formula

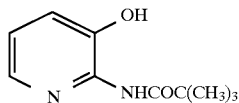

in 30 ml of ethyl acetate. A solution of 5.3 g of sodium carbonate in 50 ml of water was then added, followed by the dropwise addition of a solution of 6.8 g of ammonium peroxodisulfate in 50 ml of water. The mixture was stirred overnight and then the dye was extracted and purified over a column. It was finally recrystallized from cyclohexane and dried.

This yielded 2.44 g of the dye of the formula

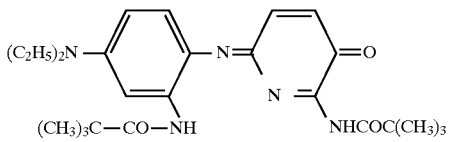

mp.: 167° C.; $\lambda_{max}$ (in tetrahydrofuran): 649 nm

EXAMPLE 4

Example 3 was repeated with the corresponding dipropylamino compound, affording 2.21 g of the dye of the formula

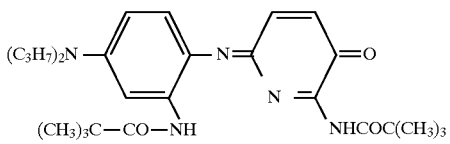

mp.: 174° C.; $\lambda_{max}$ (in tetrahydrofuran): 651 nm

EXAMPLE 5

0.03 mol of

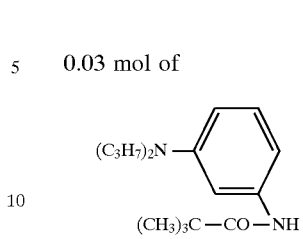

was dissolved in 50 ml of water and 15 ml of concentrated hydrochloric acid. At from 0° to 5° C. 9 ml of 23% strength by weight aqueous sodium nitrite solution were added dropwise and then stirred in at from 0° to 5° C. for 2 h. The resulting nitroso compound was adjusted with 25% strength by weight aqueous ammonia to pH 8 and then extracted with ethyl acetate. The resulting solution was added to a solution of 4.3 g (0.03 mol) of α-naphthol and 20 ml of acetic anhydride. Ethyl acetate was then distilled off at up to an internal temperature of 100° C. The dye thus isolated was precipitated with water and purified by column chromatography.

This yielded 7.5 g of the dye of the formula

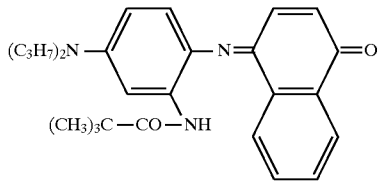

mp.: 128° C.; $\lambda_{max}$ (in tetrahydrofuran): 624 nm

The methods of the preceding examples also give the dyes listed below in Tables 1 to 5.

TABLE 1

| Ex. No. | B | $NZ^5Z^6$ | $Y^1$ | $Y^3$ | $\lambda_{max}$ [nm] in $CH_2Cl_2$ |
|---|---|---|---|---|---|
| 6 | $C(CH_3)_3$ | $N(C_2H_5)_2$ | $CH_3$ | $C_4H_9$ | 670 |
| 7 | $C(CH_3)_3$ | $N(C_2H_5)_2$ | $CH_3$ | $C_6H_{13}$ | 672 |
| 8 | $C(CH_3)_3$ | $N(C_4H_9)_2$ | $COOC_2H_5$ | $CH_3$ | 712 |
| 9 | $C(CH_3)_3$ | $N(C_4H_9)_2$ | $CH_3$ | $C_4H_9$ | 673 |
| 10 | $C(CH_3)_3$ | $N(C_2H_5)_2$ | $CH_3$ | $\begin{array}{c}C_2H_5\\|\\NHCOCHC_4H_9\end{array}$ | 673 |
| 11 | $C(CH_3)_3$ | $N(C_3H_7)_2$ | H | $C_7H_{15}$ | 655 |

TABLE 2

| Ex. No. | B | NZ$^5$Z$^6$ | X$^1$ | X$^2$ | Q$^3$ | $\lambda_{max}$ [nm] in CH$_2$Cl$_2$ |
|---|---|---|---|---|---|---|
| 12 | C(CH$_3$)$_3$ | N(C$_4$H$_9$)$_2$ | N | CH$_3$ | Cl | 677 |
| 13 | C(CH$_3$)$_3$ | N(C$_2$H$_5$)$_2$ | N | CH$_3$ | H | 643 |
| 14 | C(CH$_3$)$_3$ | N(C$_4$H$_9$) | N | CH$_3$ | H | 643 |

TABLE 3

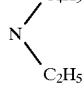

| Ex. Nr. | B | NZ$^5$Z$^6$ | Y$^4$ | $\lambda_{max}$ [nm] in CH$_2$Cl$_2$ |
|---|---|---|---|---|
| 15 | C(CH$_3$)$_3$ | (piperazinyl) | CH(C$_2$H$_5$)C$_4$H$_9$ | 675 |
| 16 | C(CH$_3$)$_3$ | N(C$_4$H$_9$)(C$_2$H$_5$) | CH(C$_2$H$_5$)C$_4$H$_9$ | 668 |
| 17 | CH(C$_2$H$_5$)C$_4$H$_9$ | (piperazinyl) | CH(C$_2$H$_5$)C$_4$H$_9$ | 624 |
| 18 | CH(C$_2$H$_5$)C$_4$H$_9$ | N(C$_4$H$_9$)$_2$ | CH(C$_2$H$_5$)C$_4$H$_9$ | 627 |
| 19 | C(CH$_3$)$_3$ | N(C$_2$H$_5$)$_2$ | CH(C$_2$H$_5$)C$_4$H$_9$ | 667 |
| 20 | C(CH$_3$)$_3$ | N(C$_3$H$_7$)$_2$ | CH(C$_2$H$_5$)C$_4$H$_9$ | 673 |
| 21 | C(CH$_3$)$_3$ | N(C$_4$H$_9$)$_2$ | CH(C$_2$H$_5$)C$_4$H$_9$ | 676 |
| 22 | C(CH$_3$)$_3$ | N(C$_2$H$_5$)$_2$ | C$_3$H$_7$ | 672 |

TABLE 4

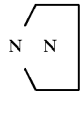

| Ex. No. | B | NZ$^5$Z$^6$ | Q$^1$ | Q$^2$ | Q$^3$ | $\lambda_{max}$ [nm] in CH$_2$Cl$_2$ |
|---|---|---|---|---|---|---|
| 23 | C(CH$_3$)$_3$ | N(C$_2$H$_5$)$_2$ | CH$_3$ | H | NHCOCH$_3$ | 649 |
| 24 | C(CH$_3$)$_3$ | N(C$_4$H$_9$)$_2$ | CH$_3$ | Cl | NHCOCH$_2$C(CH$_3$)$_3$ | 682 |
| 25 | C(CH$_3$)$_3$ | N(C$_3$H$_7$)$_2$ | CH$_3$ | H | NHCOCH(CH$_3$)$_2$ | 650 |
| 26 | C(CH$_3$)$_3$ | N(C$_4$H$_9$)$_2$ | H | H | NHCOCH$_3$ | 650 |
| 27 | CH(C$_2$H$_5$)C$_4$H$_9$ | N(C$_2$H$_5$)$_2$ | H | H | NHCOCH$_3$ | 649 |
| 28 | C(CH$_3$)$_3$ | N(C$_3$H$_7$)$_2$ | H | H | NHCOCH$_3$ | 643 |
| 29 | C(CH$_3$)$_3$ | N(C$_2$H$_5$)$_2$ | CH$_3$ | H | NHCOC(CH$_3$)$_3$ | 646 |
| 30 | C(CH$_3$)$_3$ | N(C$_3$H$_7$)$_2$ | H | H | NHCOCH(C$_2$H$_5$)C$_4$H$_9$ | 650 |
| 31 | C(CH$_3$)$_3$ | N(C$_3$H$_7$)$_2$ | CH$_3$ | H | NHCOC(CH$_3$)$_3$ | 643 |
| 32 | C(CH$_3$)$_3$ | N(C$_4$H$_9$)$_2$ | H | H | NHCOC(CH$_3$)$_3$ | 653 |
| 33 | C(CH$_3$)$_3$ | N(C$_2$H$_5$)$_2$ | CH$_3$ | H | NHCOCH(C$_2$H$_5$)C$_4$H$_9$ | 647 |
| 34 | C(CH$_3$)$_3$ | N(C$_2$H$_5$)$_2$ | CH$_3$ | Cl | NHCOCH$_3$ | 675 |
| 35 | C(CH$_3$)$_3$ | N(C$_2$H$_5$)$_2$ | H | H | NHCOCH(C$_2$H$_5$)C$_4$H$_9$ | 643 |
| 36 | C(CH$_3$)$_3$ | N(C$_2$H$_5$)$_2$ | H | H | NHCOC(CH$_3$)$_3$ | 641 |
| 37 | C(CH$_3$)$_3$ | N(C$_2$H$_5$)$_2$ | CH$_3$ | Cl | NHCOC(CH$_3$)$_3$ | 673 |
| 38 | C(CH$_3$)$_3$ | N(C$_2$H$_5$)$_2$ | CH$_3$ | Cl | NHCOCH$_2$C(CH$_3$)$_3$ | 679 |
| 39 | C(CH$_3$)$_3$ | N(C$_2$H$_5$)$_2$ | CH$_3$ | H | NHCOCH$_2$C(CH$_3$)$_3$ | 646 |
| 40 | C(CH$_3$)$_3$ | N(C$_2$H$_5$)$_2$ | H | C(CH$_3$)$_3$ | C(CH$_3$)$_3$ | 599 |
| 41 | C(CH$_3$)$_3$ | N(C$_4$H$_9$)$_2$ | CH$_3$ | Cl | NHCOCH$_3$ | 677 |

TABLE 5

$$Z^5\text{-}N(\text{-}Z^6)\text{-}\text{C}_6\text{H}_3(\text{-}B\text{-}CO\text{-}NH)\text{-}N=T$$

| Ex. No. | B | NZ⁵Z⁶ | T | $\lambda_{max}$ [nm] in $CH_2Cl_2$ |
|---|---|---|---|---|
| 42 | C(CH₃)₃ | N(C₂H₅)₂ | (structure with N, S, C(CN)₂) | 668 |
| 43 | C(CH₃)₃ | N(C₂H₅)₂ | (structure with O, O, N-C₂H₅, S, N-C₂H₅) | 559 |
| 44 | C(CH₃)₃ | N(C₂H₅)₂ | (structure with O, O, N-CH₃, S, N-CH₃) | 530 |
| 45 | C(CH₃)2 | N(C₄H₉)₂ | (structure with C₂H₅, N, S, N—CN) | 675 |
| 46 | C(CH₃)₃ | N(C₂H₅)₂ | (structure with O, O, N, N-C₆H₅, C₆H₅) | 545 |
| 47 | C(CH₃)₃ | N(C₃H₇)₂ | (structure with CH₃, CN, O, N-H, O) | 669 |

B) DYE TRANSFER

General Method:

a) 10 g of dye are stirred into 100 g of a 10% strength by weight solution of a binder in 4.5:2:2 v/v/v methyl ethyl ketone/toluene/cyclohexanone with or without brief heating to 80°–90° C.

The resulting printing ink is applied with a 6 μm doctor to a 6 μm thick polyester film, the back of which is coated with a suitable slipping layer, and dried with a hair dryer for 1 minute. Before the ink ribbon can be printed, it has to air-dry for at least 24 hours, since residual solvent can impair the printing process.

b) The ink ribbons are printed on a computer-controlled experimental setup equipped with a commercial thermal printing head onto commercially available video print paper (Hitachi VY-S).

Variation of the voltage is used to control the energy emitted by the thermal printing head, the pulse duration setting being 7 ms and only one pulse being emitted at a time. The energy emitted ranges from 0.7 to 2.0 mJ/dot.

Since the degree of coloring is directly proportional to the supplied energy it is possible to produce a color wedge for spectroscopic analysis.

The graph of the depth of color against the energy supplied per heating element is used to determine the Q* value (=energy in mJ for an absorbance of 1) and the gradient m in 1/mJ.

The results obtained are listed below in Table 6.

(With regard to the Q* and m data, the first value relates in each case to a binder based on polyester and the second value relates in each case to a binder based on polyvinyl butyral.)

TABLE 6

| Ex. No. | Q* [mJ/dot] | m [1/mJ] |
|---|---|---|
| 1 | 0.84 | 3.12 |
|   | 0.97 | 2.16 |
| 2 | 0.96 | 2.47 |
|   | 0.96 | 2.42 |
| 3 | 0.89 | 2.78 |
|   | 0.91 | 2.44 |
| 4 | 0.89 | 2.67 |
|   | 0.88 | 2.70 |
| 5 | 1.01 | 2.27 |
|   | 1.11 | 1.78 |
| 6 | 0.98 | 2.17 |
|   | 1.05 | 1.92 |
| 7 | 1.03 | 1.87 |
|   | 1.07 | 1.72 |
| 8 | — | — |
|   | 1.08 | 2.00 |
| 9 | 1.04 | 2.68 |
|   | 1.12 | 1.68 |
| 10 | 1.19 | 1.84 |
|   | 1.42 | 1.29 |
| 11 | 1.12 | 1.80 |
|   | 1.07 | 1.88 |
| 12 | 0.97 | 2.18 |
|   | 1.08 | 1.86 |
| 13 | — | — |
|   | 1.09 | 1.81 |
| 14 | 1.00 | 2.04 |
|   | 1.10 | 1.81 |
| 15 | 1.58 | 0.95 |
|   | — | — |
| 16 | 1.21 | 1.90 |
|   | 1.01 | 2.63 |
| 17 | 1.01 | 2.07 |
|   | 1.22 | 1.46 |
| 18 | — | — |
|   | 1.23 | 1.87 |
| 19 | 1.07 | 2.07 |
|   | 1.09 | 1.86 |
| 20 | — | — |
|   | 1.28 | 1.70 |
| 21 | — | — |
|   | 1.33 | 1.34 |
| 22 | 1.44 | 1.32 |
|   | 1.33 | 1.49 |
| 23 | — | — |
|   | 0.95 | 2.32 |
| 24 | 1.02 | 2.53 |
|   | 0.99 | 2.10 |
| 25 | — | — |
|   | 0.99 | 2.25 |
| 26 | 0.95 | 2.70 |
|   | 1.00 | 2.17 |
| 27 | — | — |
|   | 1.00 | 2.03 |
| 28 | 0.98 | 2.18 |
|   | 1.01 | 2.24 |
| 29 | — | — |
|   | 1.03 | 2.02 |

TABLE 6-continued
| Ex. No. | Q* [mJ/dot] | m [1/mJ] |
|---|---|---|
| 30 | — | — |
|  | 1.04 | 1.82 |
| 31 | — | — |
|  | 1.06 | 1.73 |
| 32 | — | — |
|  | 1.08 | 1.78 |
| 33 | 1.09 | 1.73 |
|  | 1.12 | 1.57 |
| 34 | 1.07 | 1.85 |
|  | 1.14 | 1.67 |
| 35 | 1.08 | 1.80 |
|  | 1.17 | 1.40 |
| 36 | — | — |
|  | 1.21 | 1.42 |
| 37 | 1.19 | 1.56 |
|  | 1.24 | 1.47 |
| 38 | 1.17 | 1.76 |
|  | 1.31 | 1.47 |
| 39 | — | — |
|  | 1.34 | 1.26 |
| 40 | — | — |
|  | 1.34 | 1.32 |
| 41 | 1.34 | 1.18 |
|  | 1.38 | 1.01 |
| 42 |  |  |
| 43 | 0.88 | 3.25 |
|  | 0.96 | 2.60 |
| 44 | 1.04 | 2.43 |
|  | 1.02 | 2.63 |
| 45 | 0.95 | 2.41 |
|  | 1.04 | 2.15 |
| 46 | 1.28 | 1.54 |
|  | 1.31 | 1.58 |
Good results are also obtained with the following dyes:
EXAMPLE 48
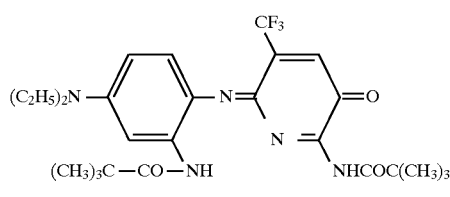
Hue: cyan
EXAMPLE 49
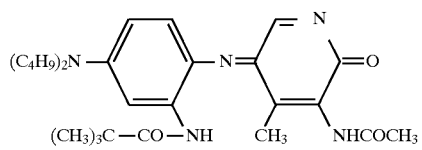
Hue: cyan
EXAMPLE 50
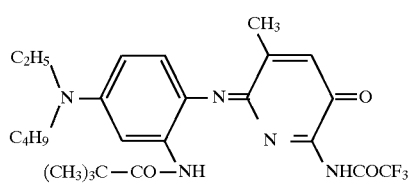
Hue: cyan
EXAMPLE 51
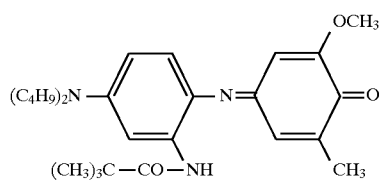
Hue: blue
EXAMPLE 52
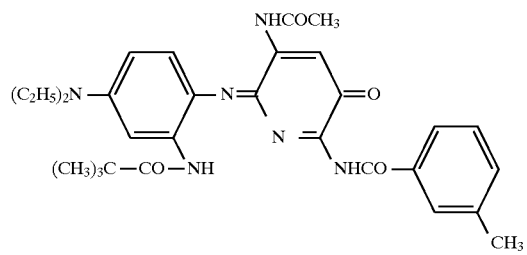
Hue: cyan
EXAMPLE 53
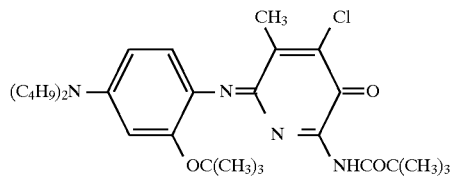
Hue: turquoise
EXAMPLE 54
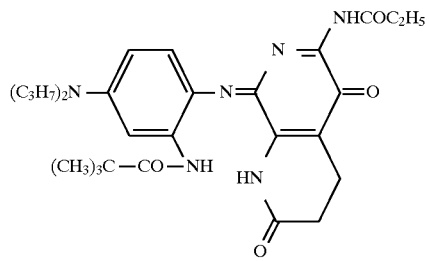
Hue: cyan
EXAMPLE 55
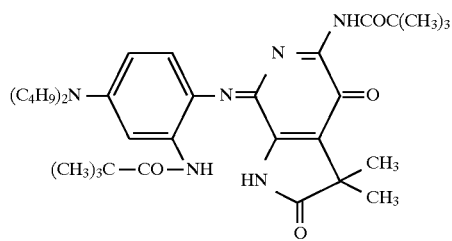
Hue: cyan

EXAMPLE 56

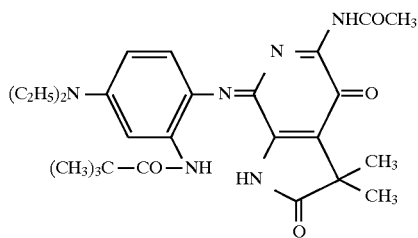

Hue: cyan

EXAMPLE 57

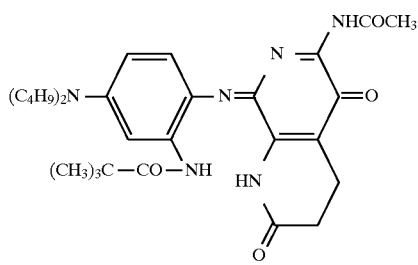

Hue: cyan

EXAMPLE 58

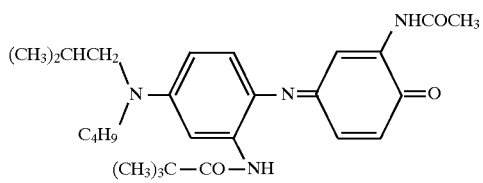

Hue: cyan

EXAMPLE 59

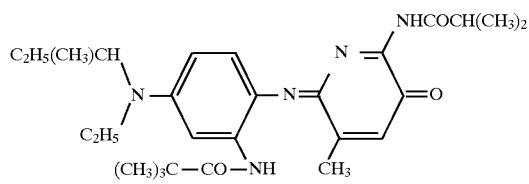

Hue: cyan

Textile Application

Dyes 5 and 28 each produce brilliant dyeings in blue and turquoise shades on polyester fabric under customary dyeing conditions (HT process). When the tert-butyl group in dyes 5 and 28 is replaced by a methyl group the dyes decompose during the dyeing process. This illustrates the high stability of the dyes of the present invention.

We claim:
1. Azamethine dyes of the formula I

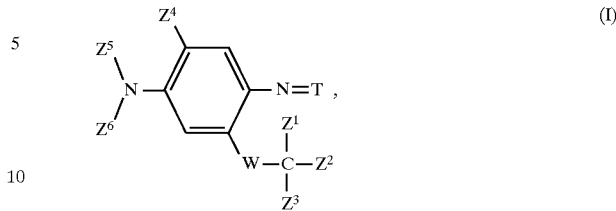

where w is oxygen, sulfur or a radical of the formula —NH—CO—, —NH—COO— or —NH—SO$_2$—, $Z^1$ is $C_1$–$C_4$-alkyl with or without interruption by an oxygen atom in ether function, benzyl, phenylethyl, phenyl or $C_1$–$C_4$-alkoxy, $Z^2$ and $Z^3$ are independently of each other hydrogen, $C_1$–$C_4$-alkyl with or without interruption by an oxygen atom in ether function, benzyl or phenylethyl, provided that radical —$CZ^1Z^2Z^3$ is not linear and is not isopropyl, $Z^4$ is hydrogen, $C_1$–$C_4$-alkyl or $C_1$–$C_4$-alkoxy, $Z^5$ and $Z^6$ are independently of each other $C_1$–$C_{10}$-alkyl with or without substitution and with or without interruption by from 1 to 3 oxygen atoms in ether function, $C_3$–$C_4$-alkenyl, $C_5$–$C_7$-cycloalkyl, phenyl or tolyl, or together with the nitrogen atom joining them together a 5- or 6-membered saturated heterocyclic radical with or without further hetero atoms, or $Z^4$ and $Z^5$ are together a 2- or 3-membered bridge member with or without a hetero atom, and T is a radical of the formula

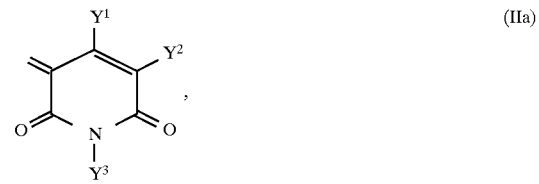
(IIa)

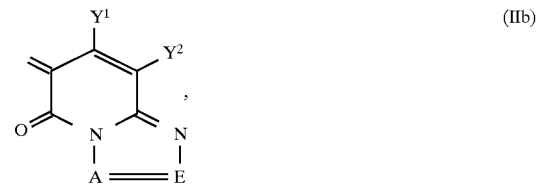
(IIb)

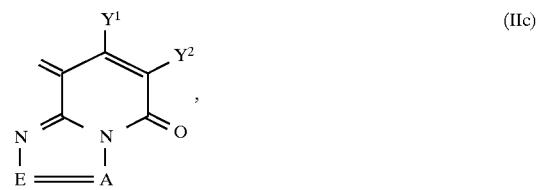
(IIc)

(IId)

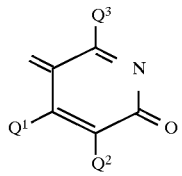

(IIe)

or

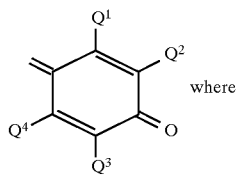

(IIf)

where $Y^1$ is hydrogen, $C_1$–$C_4$-alkyl with or without interruption by an oxygen atom in ether function, $C_1$–$C_4$-fluoroalkyl, substituted or unsubstituted phenyl or $C_1$–$C_8$-alkoxycarbonyl, $Y^2$ is cyano, carbamoyl, mono- or di($C_1$–$C_8$-alkyl)carbamoyl, carboxyl or $C_1$–$C_8$-alkoxycarbonyl, $Y^3$ is $C_1$–$C_{10}$-alkyl with or without substitution and with or without interruption by from 1 to 3 oxygen atoms in ether function, $C_5$–$C_7$-cycloalkyl, substituted or unsubstituted phenyl or a radical of the formula $NB^1B^2$, where $B^1$ and $B^2$ are independently of each other hydrogen, $C_1$–$C_{10}$-alkyl, substituted or unsubstituted phenyl, $C_1$–$C_9$-alkanoyl, phenylsulfonyl, pyridylsulfonyl, substituted or unsubstituted benzoyl, pyridylcarbonyl or thienylcarbonyl, one of A and E is a nitrogen and the other is a radical of formula C—$Y^4$ where $Y^4$ is $C_1$–$C_{20}$-alkyl with or without substitution and with or without interruption by from 1 to 4 oxygen atoms in ether function, substituted or unsubstituted phenyl, mercapto or substituted or unsubstituted $C_1$–$C_{20}$-alkylthio, and $Q^1$, $Q^2$, $Q^3$ and $Q^4$ are independently of one another hydrogen, $C_1$–$C_{10}$-alkyl, $C_1$–$C_{10}$-fluoroalkyl, $C_1$–$C_4$-alkoxy, halogen, formylamino or a radical of the formula $R^3$, —CO—$OR^1$, —CO—$NHR^1$, —CO—NH—CO—$R^1$, —CO—NH—CO—$R^3$, —CO—NH—$SO_2$—$R^3$, —NH—CO—$R^1$, —NH—CO—$OR^1$, —NH—CO—$NR^1R^2$, NH—CS—$OR^1$, —NH—CS—$NR^1R^2$, —NH—CO—$R^3$, —NH—$SO_2$—$R^1$, —NH—$SO_2$—$R^3$ or —NH—$SO_2$—$NR^1R^2$, where $R^1$ and $R^2$ are independently of each other $C_1$–$C_{10}$-alkyl with or without substitution and with or without interruption by 1 to 3 oxygen atoms in ether function, $C_1$–$C_{10}$-fluoroalkyl, $C_5$–$C_7$-cycloalkyl, phenyl or tolyl or —$NR^1R^2$ is also amino and $R^3$ is a 5- or 6-membered aromatic heterocyclic radical with or without benzofusion and with or without one or more hetero atoms selected from the group consisting of nitrogen, oxygen and sulfur, or $Q^1$ and $Q^2$ are together with the carbon atoms to which they are bonded a 5- or 6-membered carbocylic or heterocyclic ring.

2. Azamethine dyes as claimed in claim 1 wherein W is a radical of the formula —NH—CO—.

3. Azamethine dyes as claimed in claim 1 wherein $Z^1$, $Z^2$ and $Z^3$ are independently of one another $C_1$–$C_4$-alkyl.

4. Azamethine dyes as claimed in claim 1 wherein $Z^4$ is hydrogen.

5. Azamethine dyes as claimed in claim 1 wherein $Z^5$ and $Z^6$ are independently of each other $C_1$–$C_{10}$-alkyl or together with the nitrogen atom joining them together a 5- or 6-membered saturated heterocyclic radical with or without an additional nitrogen or oxygen atom in the ring.

6. Azamethine dyes as claimed in claim 1 wherein $Y^1$ is $C_1$–$C_4$-alkyl.

7. Azamethine dyes as claimed in claim 1 wherein $Y^2$ is cyano.

8. Azamethine dyes as claimed in claim 1 wherein $Y^3$ is $C_1$–$C_{10}$-alkyl, $C_1$–$C_9$-alkanoylamino, benzoylamino, bis($C_1$–$C_9$-alkanoyl)amino or N-($C_1$–$C_9$-alkanoyl)-N-benzoylamino.

9. Azamethine dyes as claimed in claim 1 wherein $Y^4$ is $C_1$–$C_{20}$-alkyl, with or without interruption by from 1 to 4 oxygen atoms in ether function.

10. Azamethine dyes as claimed in claim 1 wherein $Q^1$, $Q^2$, $Q^3$ and $Q^4$ are independently of one another hydrogen, $C_1$–$C_8$-alkyl, halogen or $C_1$–$C_{11}$-alkanoylamino or $Q^1$ and $Q^2$ are together with the carbon atoms to which they are bonded a benzene, pyridine, pyrrolinone or dihydropyridone ring which may be $C_1$–$C_4$-alkyl- or halogen-substituted.

11. Azamethine dyes as claimed in claim 2, wherein $Y^1$ is $C_1$–$C_4$-alkyl.

12. Azamethane dyes as claimed in claim 2, wherein $Y^2$ is cyano.

13. Azamethine dyes as claimed in claim 2, wherein $Y^3$ is $C_1$–$C_{10}$-alkyl, $C_1$–$C_9$-alkanoylamino, benzoylamino, bis($C_1$–$C_9$-alkanoyl)amino or N-($C_1$–$C_9$-alkanoyl)-N-benzoylamino.

14. Azamethane dyes as claimed in claim 2, wherein $Y^4$ is $C_1$–$C_{20}$-alkyl, with or without interruption by from 1 to 4 oxygen atoms in ether function.

15. Azamethine dyes as claimed in claim 2, wherein $Q^1$, $Q^2$, $Q^3$ and $Q^4$ are each, independently, hydrogen, $C_1$–$C_8$-alkyl, halogen or $C_1$–$C_{11}$-alkanoylamino or $Q^1$ and $Q^2$ are together with the carbon atoms to which they are bonded a benzene, pyridine, pyrrolinone or dihydropyridone ring which may be $C_1$–$C_4$-alkyl- or halogen-substituted.

16. A process for transferring dyes from a transfer to a plastic-coated paper by diffusion or sublimation by means of an energy source, which comprises using a transfer comprising one or more azamethine dyes as claimed in claim 1.

17. A process for transferring dyes from a transfer to a plastic-coated paper by diffusion or sublimation by means of an energy source, which comprises using a transfer comprising one or more azamethine dyes as claimed in claim 2.

* * * * *